United States Patent
Hemmi et al.

(10) Patent No.: US 6,856,665 B2
(45) Date of Patent: Feb. 15, 2005

(54) METHOD FOR CONTROLLING WATER QUALITY IN NUCLEAR REACTOR AND NUCLEAR POWER PLANT TO WHICH THE METHOD IS APPLIED

(75) Inventors: Yukio Hemmi, Yokohama (JP); Kenji Yamazaki, Yokohama (JP); Hajime Hirasawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/964,624

(22) Filed: Sep. 28, 2001

(65) Prior Publication Data

US 2002/0039399 A1 Apr. 4, 2002

(30) Foreign Application Priority Data

Sep. 29, 2000 (JP) ........................................ 2000-300824

(51) Int. Cl.[7] ................................................ G21C 9/00
(52) U.S. Cl. ........................................ 376/306; 376/305
(58) Field of Search ................................ 376/306, 305, 376/441, 442

(56) References Cited

U.S. PATENT DOCUMENTS

| 4,526,626 | A | * | 7/1985 | Carter | .......................... 148/273 |
|---|---|---|---|---|---|
| 4,828,790 | A | * | 5/1989 | Honda et al. | ................. 148/287 |
| 4,894,202 | A | * | 1/1990 | Nagase et al. | ............... 376/306 |
| 4,927,598 | A | * | 5/1990 | Nishino et al. | .............. 376/306 |
| 5,130,081 | A | * | 7/1992 | Niedrach | ...................... 376/305 |
| 5,375,152 | A | * | 12/1994 | Lin | .............................. 376/305 |
| 5,398,269 | A | * | 3/1995 | Nagase et al. | ............... 376/306 |
| 5,904,991 | A | * | 5/1999 | Hettiarachchi | ............... 376/305 |
| 5,995,576 | A | * | 11/1999 | Midorikawa et al. | ........ 376/306 |

FOREIGN PATENT DOCUMENTS

JP 2808970 7/1998

* cited by examiner

Primary Examiner—Michael Carone
Assistant Examiner—Rick Palabrica
(74) Attorney, Agent, or Firm—Oblon, Spivak, McClelland, Maier & Neustadt, P.C.

(57) ABSTRACT

A method for controlling water quality in a nuclear reactor comprises a first and second steps. The first step is to make an amount of iron, which is carried into the nuclear reactor and corrosively eluted from structural material within the nuclear reactor into reactor water, at least twice as much as any one of an amount of nickel, which is carried into the nuclear reactor, and an amount of nickel, which is generated in the nuclear reactor. The second step is to limit an upper limit of concentration value of iron in system water supplied into the nuclear reactor to up to 0.10 ppb.

3 Claims, 3 Drawing Sheets

METHOD FOR CONTROLLING WATER QUALITY IN NUCLEAR REACTOR AND NUCLEAR POWER PLANT TO WHICH THE METHOD IS APPLIED

BACKGROUND OF THE INVENTION

1. Field of the Invention

The present invention relates to a method for controlling water quality in a nuclear reactor, which permits to reduce concentration of cobalt radioactivity of nuclear reactor water in a nuclear power plant, as well as an amount of cobalt radioactivity transferred to an outer surface of a reactor core, and to a nuclear power plant having material, which has been changed to stainless steel effective in control of the water quality mentioned above.

2. Description of the Related Art

Many kinds of quality controlling methods in the nuclear power plant have been proposed and put into practice in order to reduce concentration of cobalt radioactivity of nuclear reactor water in the nuclear power plant, as well as an amount of cobalt radioactivity transferred to an outer surface of the reactor core. Principal methods will be described below.

There has been a method for adding iron into supply water (at an amount of at least 0.3 to 0.5 ppb at iron concentration in the supply water) to make an amount of iron, which is carried into the nuclear reactor and corrosively eluted from structural material within the nuclear reactor into nuclear reactor water, at least twice as much as any one of an amount of nickel, which is carried into the nuclear reactor, and an amount of nickel, which is generated in the nuclear reactor, thus reducing concentration of cobalt radioactivity in the reactor water.

According to the above-mentioned conventional method, it is possible to reduce concentration of ionic cobalt radioactivity in the reactor water. The conventional method however has problems of acceleration of transfer velocity of ionic cobalt radioactivity transferred outside the reactor core as well as adverse increase in concentration of radioactivity due to granular material. In addition, use of material for coated fuel pipes, which has been subjected to a specific surface treatment to provide an excellent corrosion resistance, leads to an enhanced extent of elution of radioactivity from particles adhering on the surface of the coated fuel pipes and a lower reduction ratio of concentration of ionic cobalt radioactivity in the reactor water. As a result, there has not been expected an effect of reduction in ionic cobalt radioactivity transferred outside the reactor core.

There is known a zinc injection method as a water quality control method for reducing transfer of cobalt radioactivity to the outside surface of the reactor core. According to such a zinc injection method, activation however generates radioactivity of Zn-65 with the result that natural zinc cannot be used and zinc from which the Zn-65 has been removed by means of a high-priced centrifugal separator must be used in a large amount.

In view of such circumstances, there has been developed an extremely low iron condition operation method, which permits to reduce remarkably transfer velocity of ionic cobalt radioactivity transferred outside the reactor core, although concentration of ionic cobalt radioactivity in the reactor water slightly increases. According to such a method, it is possible to reduce remarkably adhesion of particles on the surface of coated fuel pipes, resulting in remarkable reduction in concentration of radioactivity due to particle material in a nuclear reactor residual heat removal system (hereinafter referred to as the "RHR system") for removing residual heat upon a reactor shutdown. Such a method however has a problem of impossibility of reducing radioactivity in a fuel exchange pool and the like, due to the fact that particles adhering on the surface of the coated fuel pipes easily tend to peel off.

SUMMARY OF THE INVENTION

An object of the present invention, which was made in consideration of the above-mentioned circumstances, is therefore to provide a method for controlling water quality in a nuclear reactor, which permits to reduce remarkably concentration of cobalt radioactivity due to ions and particle material in reactor water and reduce an amount of cobalt radioactivity transferred to the surface of a reactor core, as well as a nuclear power plant to which the above-mentioned method is applied.

In the method of the present invention for controlling water quality in a nuclear reactor, an amount of iron carried into the nuclear reactor serving as a source of radioactivity is minimized as much as possible in order to reduce remarkably an amount of $NiFe_2O_4$ adhering on the surface of coated fuel pipes in a fuel assembly serving as a source of ions and radioactivity in the nuclear reactor. An amount of iron contained in system water such as supply water supplied into the nuclear reactor is limited up to 0.10 ppb and preferably up to 0.04 ppb as an upper limit value, and more preferably limited up to zero as closely as possible. In such a case, a nickel concentration in the reactor water is maintained so as to be less than 0.2 ppb.

Thus, in the nuclear power plant of the present invention, material for forming heat-exchange tubes of a high pressure feed-water heater serving as a main source of nickel as well as fuel springs of structural parts of a fuel assembly in the reactor is changed from nickel base alloy to ferrite, and in the method of the present invention for controlling water quality in the nuclear reactor, the above-mentioned material is subjected to a preliminary oxidation treatment so as to prevent corrosion, reducing remarkably an amount of nickel generated. This causes cobalt radioactivity in the reactor water to reduce remarkably so that an amount of iron generated is made at least twice as much as an amount of nickel generated. Fuel springs also serve as the source of ion cobalt radioactivity in the reactor water, other than $NiFe_2O_4$ on the surface of coated fuel pipes. The above-mentioned preliminary oxidation treatment and change in material for forming the fuel springs makes it possible to control corrosion, thus remarkably reducing occurrence of corrosion.

It is necessary to remove iron by means of an iron removing device in system water other than condensate in order to minimize an amount of iron carried from supply water into the reactor as much as possible. When material for pipes and equipment disposed on the nuclear reactor fist order system is changed from carbon steel to a corrosion resistant material of stainless steel as in the nuclear power plant according to the present invention, it is possible to reduce costs especially for safekeeping countermeasures under a shutdown or stand-by condition.

Arrangement of a reactor water high-temperature purifying device utilizing filter medium made of ferrite or iron-base alloy in the nuclear reactor first order system causes iron to be carried from supply water without increasing an amount of iron, which is eluted through corrosion into the reactor water in the nuclear reactor, thus making it possible to remove nickel generated in the nuclear reactor.

Contributing ratio to exposure to Co-60 increases, in comparison with Mn-54 generated from iron and Co-58 generated from Fe-59 and nickel, under a condition in which minimization control of iron and nickel is carried out. It is therefore effective to change material used for forming a reactor core structural material and large-diameter valves serving as a main source of cobalt to low-cobalt material.

More specifically, a method of the present invention for controlling water quality in a nuclear reactor comprises the steps of: making an amount of iron, which is carried into the nuclear reactor and corrosively eluted from structural material within the nuclear reactor into reactor water, at least twice as much as any one of an amount of nickel, which is carried into the nuclear reactor, and an amount of nickel, which is generated in the nuclear reactor; and limiting an upper limit of concentration value of iron in system water supplied into the nuclear reactor to up to 0.10 ppb. It is preferable to limit the upper limit of concentration value of the iron to up to 0.04 ppb.

In accordance with our findings obtained, cobalt is similar to nickel in chemical behavior. Cobalt, a generated amount of which is so small of $1/100$ orders of nickel, behaves as accompanied by nickel. It is well known from achievements of domestic boiling water reactors (hereinafter referred to simply as "BWR") that an amount of iron generated, which is made at least twice as much as an amount of nickel generated, does not make the nickel concentration in the reactor water equal to or more than 0.2 ppb.

This is because that $NiFe_2O_4$ in $Fe-Ni-H_2O$ system is thermodynamically stable, with the result that $NiFe_2O_4$ generates in accordance with the following reaction formula (1) and cobalt is carried stably, thus reducing concentration of Co-60 ion:

$$Ni+2Fe+4H_2O=NiFe_2O_4+4H_2 \quad (1)$$

It is understood that nickel solubility of $NiFe_2O_4$ is about 0.2 ppb. Addition of iron into supply water increases $NiFe_2O_4$ generated on the surface of coated fuel pipes so that peeling of $NiFe_2O_4$ increases radioactivity of Co-60 in the form of particle.

On the contrary, when an amount of iron generated is made up to twice as much as an amount of nickel generated, nickel concentration of the reactor water becomes equal to or more than 0.20 ppb. As a result, NiO generates, which is thermodynamically stable, on the surface of coated fuel pipes through boiling concentration. Co carried into NiO is activated to elute again in the form of Co-60, thus increasing concentration of the ionic radioactivity.

In view of these facts, requirements of reducing simultaneously ions and particles of Co-60 in the reactor water are to minimize an amount of iron, which is carried into the nuclear reactor and corrosively eluted from structural material within the nuclear reactor into the reactor water and to make an amount of iron, which is carried into the nuclear reactor and corrosively eluted from structural material within the nuclear reactor into reactor water, at least twice as much as any one of an amount of nickel, which is carried into the nuclear reactor, and an amount of nickel, which is generated in the nuclear reactor. With respect to Co-58 generated from nickel, the same conclusion is applied.

A technical measure for reducing iron concentration of supply water has already given satisfactory results of 0.04 ppb in a plant provided with a high-performance iron removing device, which is composed of a hollow thread-type filter and an ion exchange resin tower, in a condensate purifying system.

So long as the existing material for forming coated fuel pipes having an excellent corrosion resistance is used, an amount of Co-60 eluted is larger than an amount of Co-60 captured by $NiFe_2O_4$ on the surface of the coated fuel pipes, with the result that $NiFe_2O_4$ on the surface of the coated fuel pipes becomes the source of Co-60. Accordingly, an amount of Co-60 ion generated decreases according as $NiFe_2O_4$ on the surface of the coated fuel pipes decreases. $NiFe_2O_4$, which peels off from the surface of the coated fuel pipes, causes Co-60 in the form of particle to generate. It is therefore preferable to reduce $NiFe_2O_4$ on the surface of the coated fuel pipes as much as possible. Iron carried from supply water into the nuclear reactor causes $NiFe_2O_4$ on the surface of the coated fuel pipes to generate. It is therefore significant to reduce iron concentration of the supply water on a lower level than the existing condition.

The main source of iron in the BWR plant is nickel base alloy material, which is used for heat-exchange tubes of a feed-water heater, which serves as the main source of nickel, and for the fuel assembly in the inside of the reactor. Accordingly, application of a preliminary oxidation treatment to the existing material makes it possible to inhibit corrosion and reduce remarkably an amount of nickel generated. This makes an amount of iron at least twice as much as an amount of nickel generated.

According to the present invention, introduction of natural zinc into the nuclear reactor water to limit the zinc ion concentration value to up to 5 ppb makes it possible to cause an amount of $ZnFe_2O4$ in a place other than the surface of coated fuel pipes to become null. It is also possible to inhibit generation of ZnO on the surface of the coated fuel pipes as well as generation of Zn-65 due to $ZnFe_2O_4$ generated. When the iron concentration value of supply water is 0.04 ppb, it corresponds to $1/10$ of iron amount of supply water in a domestic BWR plant and $1/50$ of that in a BWR plant in many foreign countries. In this case, an amount of Zn-65 generated on the surface of coated fuel pipes comes merely to the same extent as in the case where expensive zinc, from which Zn-64 has been removed, is used in the foreign BWR plants, even when natural zinc is used.

Carbon steel is used for material for forming pipes and shells of equipment in a nuclear reactor coolant purifying system (hereinafter referred to as the "RWCU system") and the RHR system. Corrosion of carbon steel in the RWCU system during operation of the plant is low which is about twice as much as stainless steel. Water quality is deteriorated upon the plant shutdown, leading to serious corrosion of the carbon steel. In the RHR system, there occurs serious corrosion of the carbon steel in a stand-by condition during operation of the plant. Accordingly, the existing material is subjected to a treatment such as flushing prior to a making up operation to remove iron rust. Such operation and safe-keeping decrease an amount of iron flowing from these systems into the nuclear reactor to a negligible extent in comparison with an amount of iron carried from the supply water. Formation of these systems of stainless steel makes these operations unnecessary.

Use of a reactor water high-temperature purifying device having filter medium made of ferrite or ferritic alloy makes it possible to capture nickel in accordance with a reaction indicated in the following reaction formula (2) to generate $NiFe_2O_4$:

$$Fe_2O_3+Ni+H_2O=NiFe_2O_4+H_2 \quad (2)$$

It is therefore possible to remove nickel from the reactor water.

The main source of iron in the BWR plant is nickel base alloy material, which is used for the heat-exchange tubes of the feed-water heater, which serves as the source of nickel, and for the fuel assembly in the inside of the reactor. Use of ferrite as a corrosion resistant material having a smaller nickel content than the existing material makes it possible to inhibit corrosion and reduce remarkably an amount of nickel generated. This makes an amount of iron at least twice as much as an amount of nickel generated.

A remarkable reduction of an amount of nickel makes an amount of iron generated at least twice as much as an amount of nickel due to existence of ferrite, which is generated through corrosion of stainless steel in the reactor, even when iron concentration of the supply water decreases to become null. In such a case, it is preferable to reduce the iron concentration of the supply water as low as possible. An iron removing device is required to make the iron concentration of the supply water null. The condition for making an amount of iron generated at least twice as much as an amount of nickel may exist in the intermediate portion between 0.04 ppb as the existing value and zero, depending on an extent of reduction in an amount of nickel generated.

With respect to functions required for the high-performance iron-removing device, temperature is a significant factor of influence on characteristics of iron and the filter material.

Iron which is eluted as ions from material used for a reactor core structural material such as fuel springs directly into the reactor water under conditions in which an amount of iron carried is minimized accounts for about 2/3 of the total amount of iron generated. A technical specification value of cobalt content of the above-mentioned material is up to 0.05% and an actual value of 0.03%. Accordingly, reduction in the technical specification value of cobalt content up to 0.01% makes it possible to reduce concentration of ionic Co-60 in the reactor water substantially to half.

Reduction in an amount of cobalt generated will suffice in order to reduce a CRUD (Chalk River Unclassified Deposit) Co-60 in the reactor water under conditions in which an amount of iron carried is minimized. Under the present circumstances, the Co-base alloys for the turbine blade and the large-diameter valve make up 30% and 40% of the source of cobalt, respectively. Therefore, when the Stellite as the cobalt base alloy is changed to nickel base alloy, it becomes possible to reduce an amount of cobalt generated to one fourth thereof in the present circumstances.

When there are taken both measures of change in material and reduction in cobalt content of material used for the reactor core structural material such as fuel springs, it is possible to further reduce concentration of ionic Co-60 in the reactor water to up to one third.

According to the present invention, it is possible to reduce remarkably concentration of cobalt radioactivity due to ions and particle material in the reactor water and reduce an amount of cobalt radioactivity transferred to the surface of the reactor core in this manner. This completely prevents not only occurrence of radiation exposure, but also production of radioactive waste, resulting in reduction in maintenance fee concerning radioactivity and improving operation efficiency so as to contribute to reduction in maintenance period of time.

DETAILED DESCRIPTION OF THE PREFERRED EMBODIMENTS

Now, embodiments of the present invention will be described in detail below with reference to the accompanying drawings.

Figure 1:
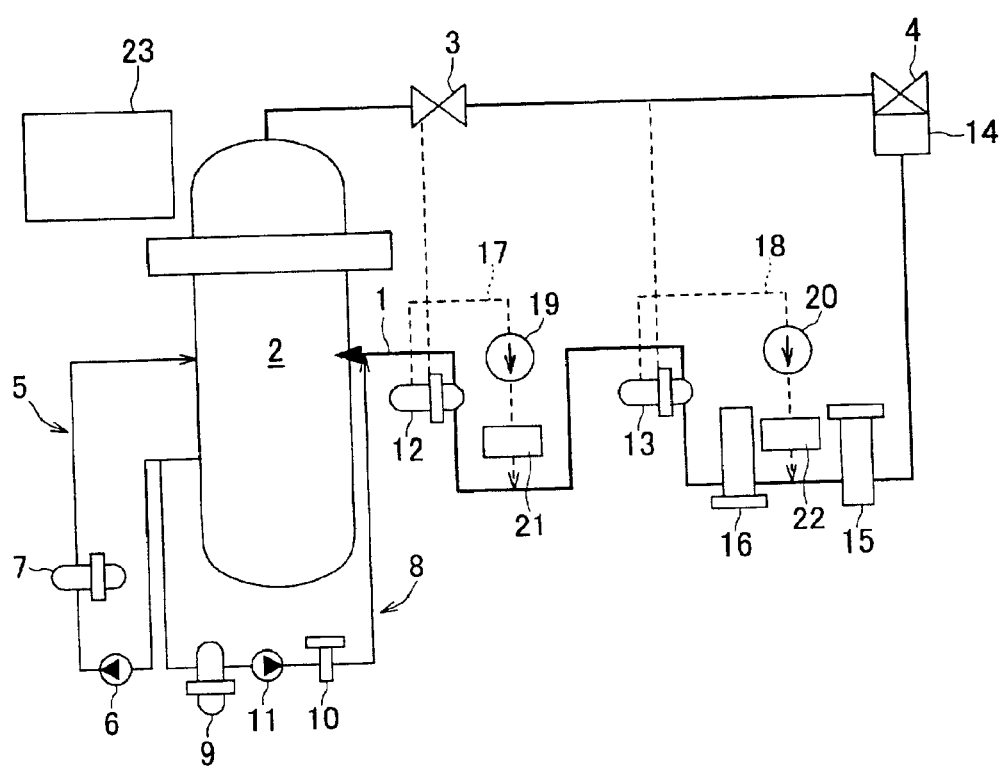
FIG. 1 is a schematic system view illustrating an embodiment in which a method of the present invention for controlling water quality in a nuclear reactor and a nuclear power plant of the present invention are applied to a first order system of an advanced boiling water reactor.

FIG. 1 is a schematic system view illustrating an embodiment in which a method of the present invention for controlling water quality in a nuclear reactor and a nuclear power plant of the present invention are applied to a first order system of an advanced boiling water reactor (ABWR).

FIG. 1 shows sources of iron and nickel, which are carried into the nuclear reactor and generated through corrosion of structural material in the nuclear reactor.

As shown in FIG. 1, system water such as supply water from water supply system 1 is carried into the nuclear reactor 2. The reactor water thus carried is heated by heat, which is given through nuclear fission of nuclear fuel in the nuclear reactor 2, and is vaporized so that the thus vaporized reactor water is supplied to a high-pressure turbine 3 and a low-pressure turbine 4 to perform power generation.

The reactor water is sent to the RHR system 5 in the reactor shutdown state. The reactor water is then forcedly circulated by means of an RHR pump 6 disposed in the RHR system 5 so that residual heat is removed effectively from the reactor water by an RHR heat exchanger 7 in the reactor shutdown state.

Part of the reactor water is introduced into an RWCU system 8 in the reactor starting and shutdown states and cooled by means of an RWCU heat exchanger 9. Then, impurities are removed from the reactor water by an RWCU removing device 10 and the reactor water is returned to the water supply system 1 by means of an RWCU pump 11.

On the other hand, part of vapor generated is utilized to preheat the supply water in a high-pressure supply water heater 12 and a low-pressure supply water heater 13. Vapor having contributed to power generation becomes water in a condenser 14, and impurities are then removed from the water by a condenser filter 15 serving as an iron removing device and a condensate demineralizer 16, in order to prevent corrosive product from being carried from the supply water system 1 into the nuclear reactor 2.

A high-pressure supply water drain line 17 and a low-pressure supply water drain line 18, which are connected to the supply water system 1, are connected to the high-pressure supply water heater 12 and the low-pressure supply water heater 13, respectively. The drain lines 17 and 18 are provided with a high-pressure drain pump 19 and a low-pressure drain pump 20, respectively, and with high-performance iron removing devices 21 and 22, respectively. In FIG. 1, a fuel exchange pool 23 is disposed in the vicinity of the nuclear reactor 2. In FIG. 1, a reactor water high-temperature purifying device described later is omitted.

The RHR system 5 is kept in a stand-by state during operation of plant, so that iron is not carried from the RHR system 5. Iron and nickel generate in the nuclear reactor 2 and the RWCU system 8 through which nuclear reactor water flows. Stainless steel and Ni-base alloy are used for equipment in the nuclear reactor 2.

Almost all of iron and nickel generated through corrosion of stainless steel forms oxides generated on the surface of material. The main component of the stainless steel is iron. Accordingly, iron content is more than enough as compared with nickel content, in order to form $NiFe_2O_4$. It is sufficient to capture an element by chemical equivalent, which can make up shortage, which makes it impossible to cause nickel generated in the Ni-base alloy in the nuclear reactor 2 and nickel carried from the supply water system 1 into the nuclear reactor 2 to form an appropriate amount of $NiFe_2O_4$ through the nuclear water.

In case of Ni-base alloy, nickel content is more than enough as compared with iron content in a converse manner to the stainless steel, so that excessive nickel elutes into the nuclear reactor water. Almost all of nickel eluted into the nuclear reactor water comes from the Ni-base alloy from which the fuel springs of the fuel assembly are made. An amount of nickel generated in an equilibrium core is 0.04 ppb, which is a concentration value converted into the supply water.

In the RWCU system 8, carbon steel is used for system pipes and shells of the RWCU heat exchanger 9. Stainless steel is used for heat exchange tubes of the RWCU heat exchanger 9. Corrosion velocity of the carbon steel during the operation of the plant is twice as much as the stainless steel at the most and wetted area of the carbon steel is less than 5% of the stainless steel. Corroded iron forms $NiFe_2O_4$, like the stainless steel. Amounts of iron and nickel generated in the existing nuclear reactor are shown in the form of concentration value converted into the supply water after achievement of the equilibrium core. Amounts of iron and nickel generated are $12.6t^{-0.5}$ ppb [t:EFPH (Effective Full Power Hour)] and $(3.4t^{-0.5}+0.04)$ ppb (t:EFPH), respectively. Here, "0.04" is a contribution to generation from the fuel springs of Ni-base alloy.

Now, description will be given of flowing form of iron and nickel from the supply water system 1 into the nuclear reactor 2. Main sources of iron are carbon steel and low alloy steel, which form a main vapor valve (not shown), the high-pressure turbine 3, the low-pressure turbine 4 and the condenser 14. Iron eluted from these sources flows into the supply water system 1 through three routes described below.

The first route passes through the condensate filter 15 by which almost all iron in the form of particle contained in the condensate from the condenser 14 is removed, the condensate demineralizer 16 by which part of ionic iron is removed, and extends into the nuclear reactor 2 through the supply water system 1.

The second route extends from the low-pressure drain line 18 to the condensate on the downstream side of the condenser 14, passes through the condensate demineralizer 16 by which part of iron in the form of particle and ion is removed, and extends into the nuclear reactor 2 through the supply water system 1.

The third route extends from the high-pressure drain line 17 to the supply water system 1 and directly extends into the nuclear reactor 2.

In the existing system, the iron concentration of the supply water of about 0.04 ppb is maintained. In the existing system, the contribution rates of the first, second and third routes are 50%, 30% and 20%, respectively.

On the other hand, nickel, which flows from the supply water system 1 into the nuclear reactor 2, comes from heat-exchange tubes of the high-pressure supply water heater 12. More specifically, nickel from the shell side flows from the high-pressure supply water drain line 17 into the supply water system 1, gathers with nickel generated from the inner side of the heat exchange tube material, and extends into the nuclear reactor 2. Concentration for the supply water, which is expressed by function of a historical plant-operation period of time due to corrosion time dependency of the stainless steel used for the heat exchange pipes of the high-pressure supply water heater 12, is $12.6t^{-0.5}$ ppb (t:EFPH).

Accordingly, the total amount of iron and nickel in the form of concentration value converted into the supply water can be expressed as follows:

Total amount of iron generated in the from of concentration value converted into the supply water=$0.04+12.6t^{-0.5}$ (t: EFPH)  (3)

Total amount of nickel generated in the form of concentration value converted into the supply water=$0.04+12.6t^{-0.5}+3.4t^{-0.5}$ (t: EFPH)  (4)

The first term on the right-hand side in the formula (3) is an amount of iron carried from the supply water system 1 into the nuclear reactor 2 and the second term thereof is an amount of iron generated mainly from the stainless steel in the reactor.

The first item of the right-hand side in the formula (4) is an amount of nickel generated from the fuel springs, the second item thereof is an amount of nickel carried from the supply water system 1 into the nuclear reactor 2 and the third item thereof is an amount of nickel generated mainly from the stainless steel in the reactor.

Here, limitation of an amount of nickel generated from the fuel springs to up to ½ and limitation of an amount of nickel carried from the supply water system 1 into the nuclear reactor 2 to up to ¼.4 suffices in order to satisfy the requirement that the total amount of iron generated is made at least twice as much as the total amount of nickel generated. When an amount of iron carried from the supply water system 1 into the nuclear reactor 2 is not equal to 0.04 ppb and is up to 0.10 ppb in the form of concentration value converted into the supply water, only limitation of an amount of nickel carried from the supply water system 1 into the nuclear reactor 2 to up to ¼.4 suffices.

In the embodiment of the present invention, when the existing Ni-base alloy, i.e., "Inconel X-750" for the fuel springs is changed to Ni-base alloy of "Inconel X718" (corrosion rate of "Inconel X-718" is equal to ¼ of that of "Inconel X-750") and a high-temperature atmospheric oxidation treatment is applied to the stainless steel of the heat exchange tubes of the high-pressure supply water heater 12, corrosion velocity can be reduced to ⅕, thus satisfying the requirement that the total amount of iron generated is made at least twice as much as the total amount of nickel generated.

In this case, the requirement that the total amount of iron generated is made at least twice as much as the total amount of nickel generated is satisfied even when the concentration value of iron of the supply water decreases to 0.02 ppb. Substitution of the Ni-base alloy for forming the fuel springs by Fe-base alloy such as stainless steel causes satisfaction of the requirement that the total amount of iron generated is made at least twice as much as the total amount of nickel generated, even when the supply water has the decreased iron concentration of zero %, since the fuel springs are not the source of nickel and serves to capture nickel.

Use of ferritic stainless steel having a small nickel content for the heat exchange tubes of the high-pressure supply water heater 12 makes it possible to make an amount of nickel almost null, which is carried from the supply water system 1 into the nuclear reactor 2 and is included in the second term of the right-hand side in the formula (4). Prevention of corrosion of the fuel springs also makes it possible to reduce an amount of ionic Co-60 and Co-58 eluted from the fuel springs into the reactor water.

Under the present circumstances, carbon steel is used for the RHR system 5 and the RWCU system 8 as shown in FIG. 1. Corrosion of the carbon steel in the RWCU system 8 in the plant operating state is low about as twice as much as corrosion of the stainless steel. Corrosion velocity of the carbon steel in the RHR system 5 and the RWCU system 8 however becomes large in the plant shutdown or stand-by state. Generation of iron cannot be ignored in the RHR system 5 in which no iron-removing device is provided and a relatively long period of time for a stand-by step is required. Iron rust must therefore be removed by a flushing process or the like in the actual situation. It is possible to make these processes unnecessary, when the RHR system 5 and the RWCU system 8 disposed in the first order system of the nuclear reactor are formed of stainless steel as in the embodiment of the present invention.

Figure 2:
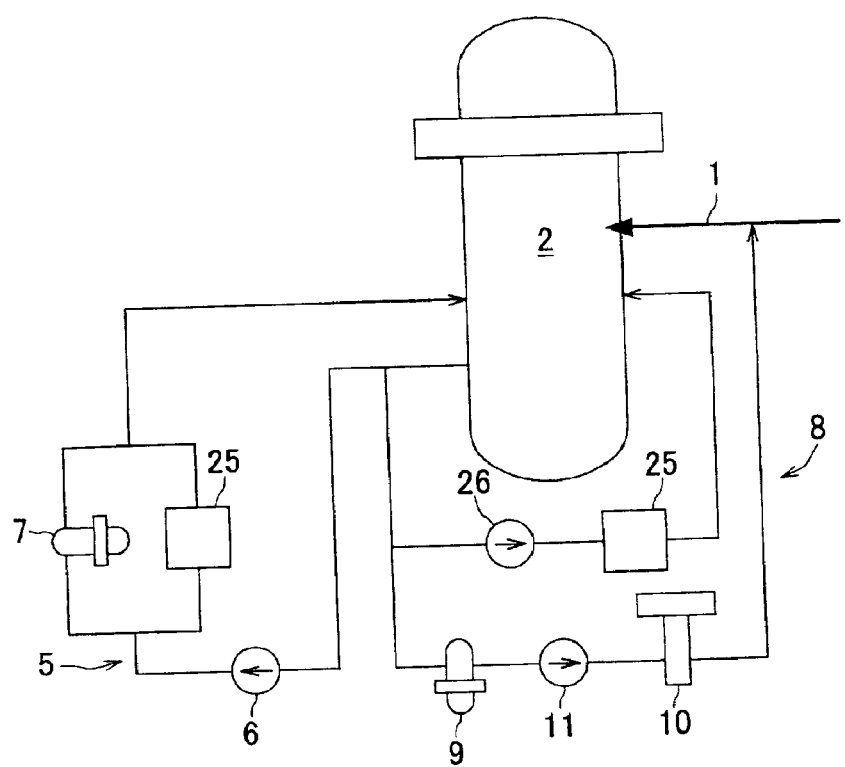
FIG. 2 is a system view illustrating an installation state of a reactor water high-temperature purifying device in the embodiment of the present invention.

In addition, in the embodiment of the present invention, a reactor water high-temperature purifying device 25, which causes nickel to be occluded in the filter medium of ferrite or ferritic alloy, is provided in the RHR system 5 and the RWCU system 8 in the first order system of the nuclear reactor as shown in FIG. 2.

In the embodiment of the present invention, an amount of iron generated in the reactor, which corresponds to the second item of the formula (3), is increased without eluding iron into the reactor water. Use of the reactor water high-temperature purifying device 25 having the filter medium of ferrite or ferritic alloy causes nickel to be captured under the reaction expressed by the formula (2) to generate $NiFe_2O_4$. It is therefore possible to remove nickel from the reactor water.

The reactor water high-temperature purifying device 25 is provided on a pipe, which branches off on the upstream side of the RWCU heat exchanger 9 in the RWCU system 8 as shown in FIG. 2 and has a pump 26. The reactor water high-temperature purifying device 25 may be provided on the downstream side of the RHR pump 6 so as to bypass the RHR heat exchanger 7. Accordingly, the reactor water high-temperature purifying device 25 may be provided in combination with the pump in principle so as to collect the reactor water and return purified water into the nuclear reactor 2.

Figure 3:
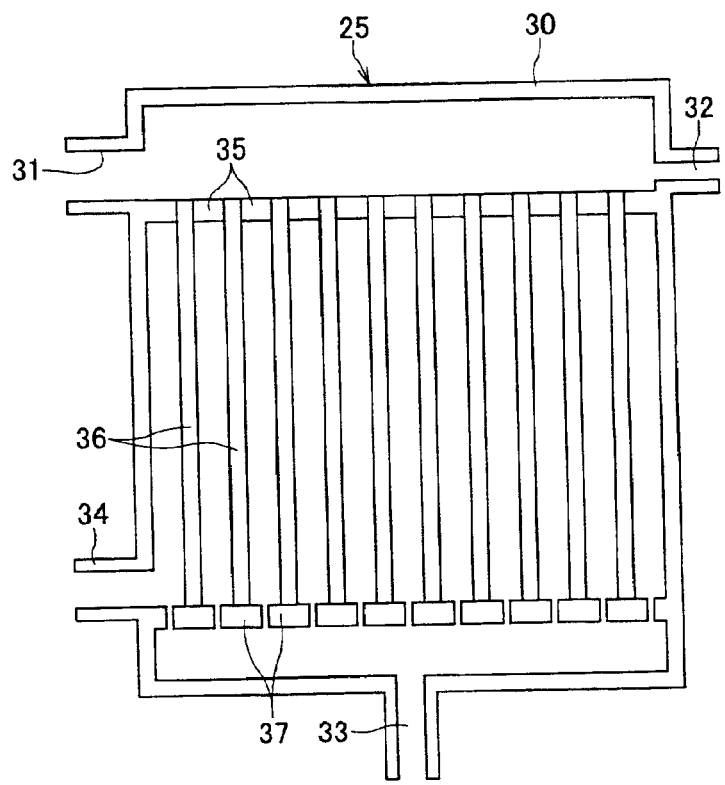
FIG. 3 is a schematic view illustrating internal structure of the reactor water high-temperature purifying device in the embodiment of the present invention.

The reactor water high-temperature purifying device 25 has a vessel 30 as shown in FIG. 3, which is provided on one side of the upper portion thereof with a water intake 31 and on the other side thereof with a back washing water inlet 32. The vessel 30 is provided on its bottom with a drain port 33. The vessel 30 is provided on the lower side thereof with a water supply port 34. The reactor water having a high degree of contamination is supplied to the above-mentioned water supply port 34 through a water supply line so that reactor water having been purified by the reactor water high-temperature purifying device 25 is discharged from the water intake 31 through a discharge line.

The vessel 30 is provided in a place, which is located below the water intake 31 and the backwashing water inlet 32, with an upper supporting plate 35 extending horizontally. The upper supporting plate 35 has a plurality of holes into which the upper ends of hollow membrane pipes 36 are fitted. The upper space and the lower space relative to the upper supporting plate 35 in the vessel are completely separated by the upper supporting plate 35 so that movement of water between the above-mentioned upper and lower spaces can be achieved only through the hollow membrane pipes 36.

Each of the hollow membrane pipes 36 has a two-layer structure that is composed of a skin layer serving as an outer layer, which has fine perforations permitting to easily cause differential pressure to capture fine particles, and a substrate layer for supporting the above-mentioned skin layer.

The vessel 30 is provided in a place, which is located below the water supply port 34 and above the drain port 33, with a lower supporting plate 37 extending horizontally. The lower supporting plate 37 has a plurality of holes. The lower supporting plate 37 supports, at its portion having no holes, the lower ends of the hollow membrane pipes 36 so as to close the lower ends of the hollow membrane pipes 36. As a result, movement of water between the upper space and the lower space relative to the lower supporting plate 37 in the vessel 30 can be achieved only through the holes of the lower supporting plate 37.

In case where particles of austenitic stainless steel such as SUS304 and SUS316 that are prescribed in JIS (Japanese Industrial Standard) are used for the filter medium, use of the filter medium having a wetted area corresponding to 1.6 times as much as that of stainless steel used for parts other than the reactor core satisfies the requirement that the total amount of iron generated is made at least twice as much as the total amount of nickel generated.

In the present embodiment, reduction in nickel content makes the total amount of iron generated at least twice as much as the total amount of nickel generated. Main sources of nickel are stainless steel (i.e., austenitic stainless steel) of the heat exchange tubes of the high-pressure supply water heater 12 as shown in FIG. 1 and Ni-base alloy of X-750 used in the fuel assembly loaded in the nuclear reactor 2, as described above. In the present embodiment, the heat exchange tubes of the high-pressure supply water heater 12 and the fuel assembly loaded in the nuclear reactor 2 are made of ferrite.

In case of the austenitic stainless steel, corrosive elution can be restricted to up to ⅕ by exposing the steel to a high purity atmosphere at a temperature of 425° C. for 2 hours and a high purity atmosphere including 3% vapor at a temperature of 350° C. for 5 hours. Corrosive velocity of ferritic stainless steel having small nickel content is equal to or larger than that of the austenitic stainless steel. Accordingly, use of such ferritic stainless steel can restrict an amount of nickel generated to a negligible extent of up to ⅕. In this case, material cost is lower than that of the austenitic stainless steel.

With respect to fuel springs, Inconel X-718 (having higher Cr and Fe contents), which is more excellent in corrosion resistance than Inconel X-750, is subjected to an age-heating process to oxidize it in an atmosphere, resulting in formation of oxide, which is composed of an inner layer of chromium-rich oxide and an outer layer of ferritic oxide and has a more stable characteristic than Inconel X-750. The resultant corrosive velocity is decreased to up to 2 mdm (mg/dm²/month) in the same manner as the austenitic stainless steel, leading to reduction of corrosive velocity to up to ¼ in comparison with the conventional material. In this case, material cost is cheaper than that of Inconel X-750. In addition, austenitic stainless steel as cold-rolled may be used for material for fuel springs. In such a case, the fuel springs do not serve as a source of nickel, but capture nickel.

In the present embodiment, there are provided the condenser filter 15 and the iron removing devices 21, 22 for removing iron from supply water system 1 supplied into the nuclear reactor 2, as shown in FIG. 1, achieving a more remarkable reduction in an amount of iron carried from the supply water.

More specifically, in case of condensate having a higher temperature than the supply water, the condenser filter 15 removes iron in the form of particle and ion. In case of drain water having a medium or higher temperature, the iron removing devices 21, 22 remove iron principally in the form of particle.

The condenser filter 15 is a composite removing unit, which is composed of a filter having pores with a diameter of up to 0.45 $\mu$m and formed into a pleated type or a hollow thread-type so as to provide a large filtration area and of an ion exchange resin tower.

Even with specifications of the existing plant design, it is possible to ensure iron concentration value of the supply water of 0.04 ppb. The high-pressure supply water drain pipe 17 and the low-pressure supply water drain pipe 18 as shown in FIG. 1 contribute to 70% control of 0.04 ppb. Iron stands in the form of particle in such a system due to higher temperature of drain water than condensate and a high dissolved oxygen concentration so that iron passing through the 4.5 $\mu$m-filter is mainly ionic iron, which has an iron concentration value of up to 0.01 ppb, which corresponds to detection limit.

Accordingly, it is possible to use, as the high-performance iron removing devices 21, 22, a device provided with the filter, which is made of heat resistant material (i.e., at least one selected from the group consisting of heat resistant resin such as tetrafluoroethylene resin and polyimide; ceramics; elements forming ceramics through oxidation, carbonization and nitriding; metal such as titanium alloy and stainless steel, material that has been obtained by subjecting these materials to a preliminary oxidation treatment so as to prevent corrosion, or material that has been obtained by subjecting titanium alloy to a nitriding or carbonization treatment; nitride and carbide such as $Si_3N_4$ and SiC that are stable even in a high-temperature water; and carbon material such as carbon fiber), formed into the pleated type or the hollow thread-type and has the pores with a diameter of up to 0.45 $\mu$m so as to prevent differential pressure from increasing, in the high-pressure supply water drain line 17 and the low-pressure supply water drain line 18.

The hollow thread-type condenser filter has conventionally been used. In the present embodiment, there may be also used the condenser filter 15 in which the pleated type filter having the same removing performance as the conventional filter is substituted for the hollow thread-type filter.

In addition, in the present invention, accumulation of ionic radioactivity of the components made of stainless steel is controlled by adding inexpensive zinc, while restricting formation of $ZnFe_2O_4$ on the surface of the coated fuel pipes without causing formation of $ZnFe_2O_4$ in a place other than the surface of the coated fuel pipes.

More specifically, in the embodiment of the present invention, limitation of zinc concentration value of water in the nuclear reactor 2 to up to 5 ppb, which is solubility of zinc into $ZnFe_2O_4$, i.e., the upper limit of an amount of zinc soluble into $ZnFe_2O_4$, prevents formation of $ZnFe_2O_4$ in the place other than the surface of the coated fuel pipes in which boiling concentration takes place. There is therefore no formation of Zn-65 due to Zn carried into the reactor core structural material.

Figure 4:
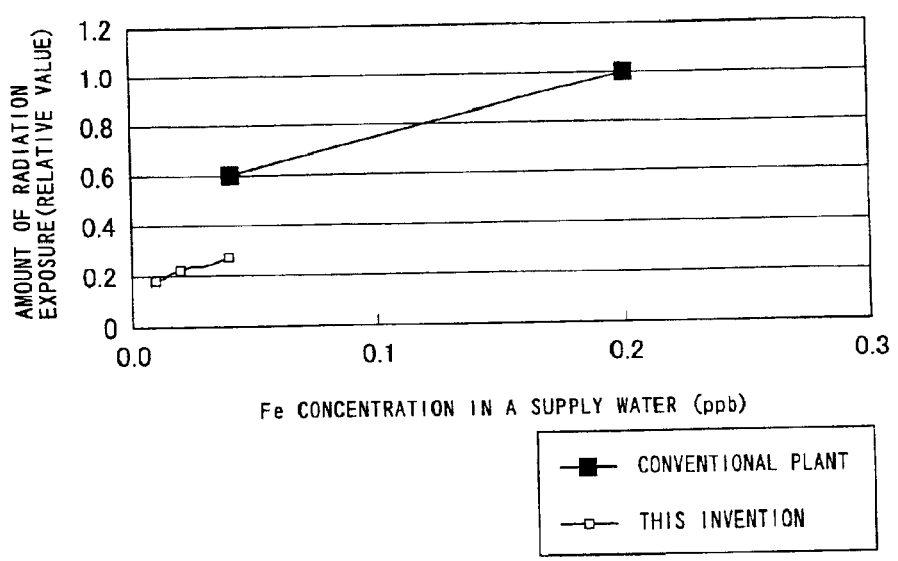
FIG. 4 is a view illustrating reduction effect in radiation exposure according to the present invention.

In addition, control in an amount of iron minimizes boiling concentration on the surface of the coated fuel pipes, thus making it possible to control formation of Zn-65 due to formation of ZnO and $ZnFe_2O_4$. The value of 0.04 ppb corresponds to $\frac{1}{10}$ of iron content of supply water in the domestic conventional BWR plant and to $\frac{1}{50}$ thereof in the BWR plant in foreign countries so that, even when natural zinc is used, an amount of Zn-65 generated on the surface of the coated fuel pipes becomes merely to the same extent as in the case where expensive zinc from which Zn-64 has been removed is used in the plant in the U.S.A. (reduction ratio of Zn-64 is from about $\frac{1}{10}$ to about $\frac{1}{50}$ in comparison with natural zinc). FIG. 4 shows reduction effects in exposure to radiation sources in the form of ion and particle, utilizing iron concentration of supply water as parameters, taking into consideration a Zn-control measure. When zinc is added in iron concentration value of supply water of 0.04 ppb, exposure is restricted to $\frac{1}{10}$.

In the embodiment of the present invention, the cobalt content of material for forming the reactor core structural material of the nuclear reactor 2 is limited to up to 0.01%.

More specifically, ratio of cobalt, which is eluted directly from material used for the reactor core structural material such as the fuel springs into the reactor water in the form of ion, makes up about $\frac{2}{3}$ of the total amount of cobalt generated, under conditions in which an amount of iron carried is minimized as much as possible. A technical specification value of cobalt content of these materials is up to 0.05% and an actual value is 0.03%. Accordingly, reduction in the technical specification value of cobalt content up to 0.01% in this embodiment makes it possible to reduce concentration of ionic Co-60 in the reactor water substantially to half.

In the embodiment of the present invention, it is possible to restrict exposure to up to $\frac{1}{50}$ by limiting the iron concentration value of supply water to 0.01 ppb in combination with the technical feature of changing Co-base alloy used for turbine blades and large-diameter valves, which are disposed in the first order system of the nuclear reactor 2 to Ni-base alloy.

What is claimed is:

1. A method for controlling water quality in a nuclear reactor comprising the steps of:

applying an atmospheric oxidation heating treatment to nickel base alloy material which is used in a feed water heater and a fuel assembly of the nuclear reactor thereby to form an oxide layer on the surface of the nickel base alloy material, so that a nickel concentration in the reactor water is maintained so as to be less than 0.2 ppb;

making an amount of iron, which is carried into the nuclear reactor and corrosively eluted from structural material within the nuclear reactor into reactor water, at least twice as much as any one of an amount of nickel, which is carried into the nuclear reactor, and an amount of nickel, which is generated in the nuclear reactor;

limiting an upper limit of concentration value of iron in system water supplied into the nuclear reactor to up to 0.10 ppb, said iron being removed by an iron removing device for removing iron from system water supplied into the nuclear reactor; and reducing and limiting the amount of nickel in system water supplied into the nuclear reactor to less than $\frac{5}{22}$ of an original amount of nickel in system water supplied into the nuclear reactor so that a total amount of iron generated is at least twice as much as a total amount of nickel generated.

2. The method as claimed in claim 1, further comprising the steps of:

reducing and limiting an amount of nickel generated from fuel springs to less than $\frac{1}{2}$ an original amount of nickel generated from fuel springs; and limiting the upper limit of concentration value of the iron to up to 0.04 ppb.

3. The method as claimed in claim 1, further comprising the step of:

introducing natural zinc into the reactor water to limit a zinc ion concentration value to up to 5 ppb.

* * * * *